(12) United States Patent
Tanaka et al.

(10) Patent No.: US 7,944,486 B2
(45) Date of Patent: May 17, 2011

(54) SIGNAL READOUT METHOD OF SOLID-STATE IMAGING DEVICE AND IMAGE SIGNAL PROCESSING METHOD

(75) Inventors: Masayuki Tanaka, Tokyo (JP); Masatoshi Okutomi, Tokyo (JP)

(73) Assignee: Tokyo Institute of Technology, Meguro-ku, Tokyo (JP)

( * ) Notice: Subject to any disclaimer, the term of this patent is extended or adjusted under 35 U.S.C. 154(b) by 573 days.

(21) Appl. No.: 11/994,564

(22) PCT Filed: Jun. 1, 2006

(86) PCT No.: PCT/JP2006/311477
§ 371 (c)(1),
(2), (4) Date: Jan. 3, 2008

(87) PCT Pub. No.: WO2007/004387
PCT Pub. Date: Jan. 11, 2007

(65) Prior Publication Data
US 2009/0207288 A1    Aug. 20, 2009

(30) Foreign Application Priority Data

Jul. 5, 2005  (JP) ................................. 2005-196608

(51) Int. Cl.
*H04N 5/235* (2006.01)
*H04N 3/14* (2006.01)
*H04N 5/225* (2006.01)
(52) U.S. Cl. .................................. 348/230.1; 348/218.1
(58) Field of Classification Search .................... None
See application file for complete search history.

(56) References Cited

U.S. PATENT DOCUMENTS

| 2002/0000508 A1* | 1/2002 | Muramatsu et al. ....... 250/208.1 |
| 2005/0078872 A1* | 4/2005 | Samadani et al. ............ 382/233 |
| 2005/0280714 A1* | 12/2005 | Freeman .................... 348/219.1 |

FOREIGN PATENT DOCUMENTS

JP           11-206516    *   2/2001
(Continued)

OTHER PUBLICATIONS

Paul E. Debevec et al., "Recovering High Dynamic Range Radiance Maps from Photographs", Computer Science Division, University of California at Berkeley, Berkley, CA, 10 pages.

(Continued)

*Primary Examiner* — Lin Ye
*Assistant Examiner* — Euel K Cowan
(74) *Attorney, Agent, or Firm* — Nixon Peabody LLP; Jeffrey L. Costellia

(57) ABSTRACT

The present invention provides a signal readout method of solid-state imaging device which can simultaneously read-outs the signals having different properties that can generate multiple images obtained by capturing the same subject under different capturing conditions from one solid-state imaging device.

A signal readout method of solid-state imaging device that is applied to a solid-state imaging device with a color filter array (CFA) and multiple pixels, the method characterized in that a pixel mixture of a different number of pixels is performed for every readout signal in the solid-state imaging device, and a signal after the pixel mixture is readout. The signal after the pixel mixture means a first signal after the pixel mixture that is obtained by performing the pixel mixture of predetermined L pixels ($L \leq n \times m$) within ($n \times m$) pixels (n and m are natural numbers) consisting of n pixels in a vertical direction and m pixels in a horizontal direction of the solid-state imaging device, and a second signal after the pixel mixture that is obtained by down sampling pixel signals of ($n \times m$) pixels without performing pixel mixture of ($n \times m$) pixels.

1 Claim, 4 Drawing Sheets

FOREIGN PATENT DOCUMENTS

| | | |
|---|---|---|
| JP | 2001-036920 | 2/2001 |
| JP | 2002-165226 | 6/2002 |
| JP | 2003-078919 | 3/2003 |
| JP | 2004-112768 | 4/2004 |
| JP | 2005-109968 | 4/2005 |

OTHER PUBLICATIONS

David Capel, "Image Mosaicing and Super-resolution" Springer, 1974, pp. 1-168.

* cited by examiner (A) DOWN SAMPLING READOUT IMAGE (B) EIGHT-PIXEL MIXED IMAGE (C) GENERATED WIDE DYNAMIC RANGE IMAGE (A) DOWN SAMPLING
READOUT IMAGE (B) EIGHT-PIXEL MIXED
IMAGE (GAIN IS ADJUSTED)

(C) SUPER-RESOLUTION
PROCESSED IMAGE

SIGNAL READOUT METHOD OF SOLID-STATE IMAGING DEVICE AND IMAGE SIGNAL PROCESSING METHOD

TECHNICAL FIELD

The present invention relates to a signal readout method of solid-state imaging device which simultaneously readouts image signals for generating multiple images from one solid-state imaging device, and also relates to an image signal processing method for generating an image having high added value based on multiple images that are generated based on the image signals readout by the signal readout method of solid-state imaging device.

BACKGROUND TECHNIQUE

In recent years, the number of the pixels of a solid-state imaging device such as a CCD image sensor is heightened. As a method which readouts signals from such a high-pixel solid-state imaging device at a high speed, a pixel mixture readout method or a down sampling readout method is utilized conventionally.

As one example of the conventional pixel mixture readout method, for example, a pixel mixture readout method that mixes nine pixels and readouts signals is disclosed in a color solid-state imaging device according to Patent Document 1. The conventional pixel mixture readout method as disclosed in Patent Document 1, performs pixel mixture of the equal number of pixels and readouts signals after pixel mixture.

In other words, in all readout signals that are readout by the conventional pixel mixture readout method, pixel mixture of the equal number of pixels is performed.

However, since the signals that are readout by the conventional pixel mixture readout method are the signals obtained by performing pixel mixture of the same number of pixels, the properties and features of these signals are equal. That is to say, there is a problem that the signals readout by the conventional pixel mixture readout method can generate only one kind of image.

Therefore, it is impossible to generate an image having high added value (for example, the image such as a wide dynamic range image or a super-resolution image obtained by a super-resolution processing) based on the signals readout by the conventional pixel mixture readout method.

DISCLOSURE OF THE INVENTION

The present invention has been developed in view of the above described circumstances, and an object of the present invention is to provide a signal readout method of solid-state imaging device which can simultaneously readouts the signals having different properties that can generate multiple images obtained by capturing the same subject under different capturing conditions from one solid-state imaging device, and also provide an image signal processing method for generating an image having high added value based on the multiple images that are generated based on the signals having different properties readout by the signal readout method of solid-state imaging device.

The present invention relates to a signal readout method of solid-state imaging device. The above object of the present invention is effectively achieved by the construction that a signal readout method of solid-state imaging device that is applied to a solid-state imaging device with a color filter array (CFA) and multiple pixels, said method characterized in that a pixel mixture of a different number of pixels is performed for every readout signal in said solid-state imaging device, and a signal after said pixel mixture is readout. The above object of the present invention is also effectively achieved by the construction that said signal after said pixel mixture means a first signal after said pixel mixture and a second signal after said pixel mixture, said first signal after said pixel mixture is obtained by performing said pixel mixture of predetermined L pixels (L≦n×m) within (n×m) pixels (n and m are natural numbers) consisting of n pixels in a vertical direction and m pixels in a horizontal direction of said solid-state imaging device, said second signal after said pixel mixture is obtained by down sampling pixel signals of said (n×m) pixels without performing said pixel mixture of said (n×m) pixels.

Further, the present invention also relates to an image signal processing method. The above object of the present invention is effectively achieved by the construction that an image signal processing method characterized in that a wide dynamic range image is generated based on said first signal after said pixel mixture and said second signal after said pixel mixture that are readout by the signal readout method of solid-state imaging device according to the present invention described above. The above object of the present invention is also effectively achieved by the construction that an image signal processing method characterized in that a registration processing of images is performed based on said first signal after said pixel mixture that is readout by the signal readout method of solid-state imaging device according to the present invention described above, and a super-resolution image is generated by performing a super-resolution processing based on displacement information obtained by said registration processing and said second signal after said pixel mixture that is readout by the signal readout method of solid-state imaging device according to the present invention described above.

THE BEST MODE FOR CARRYING OUT THE INVENTION

Figure 1:
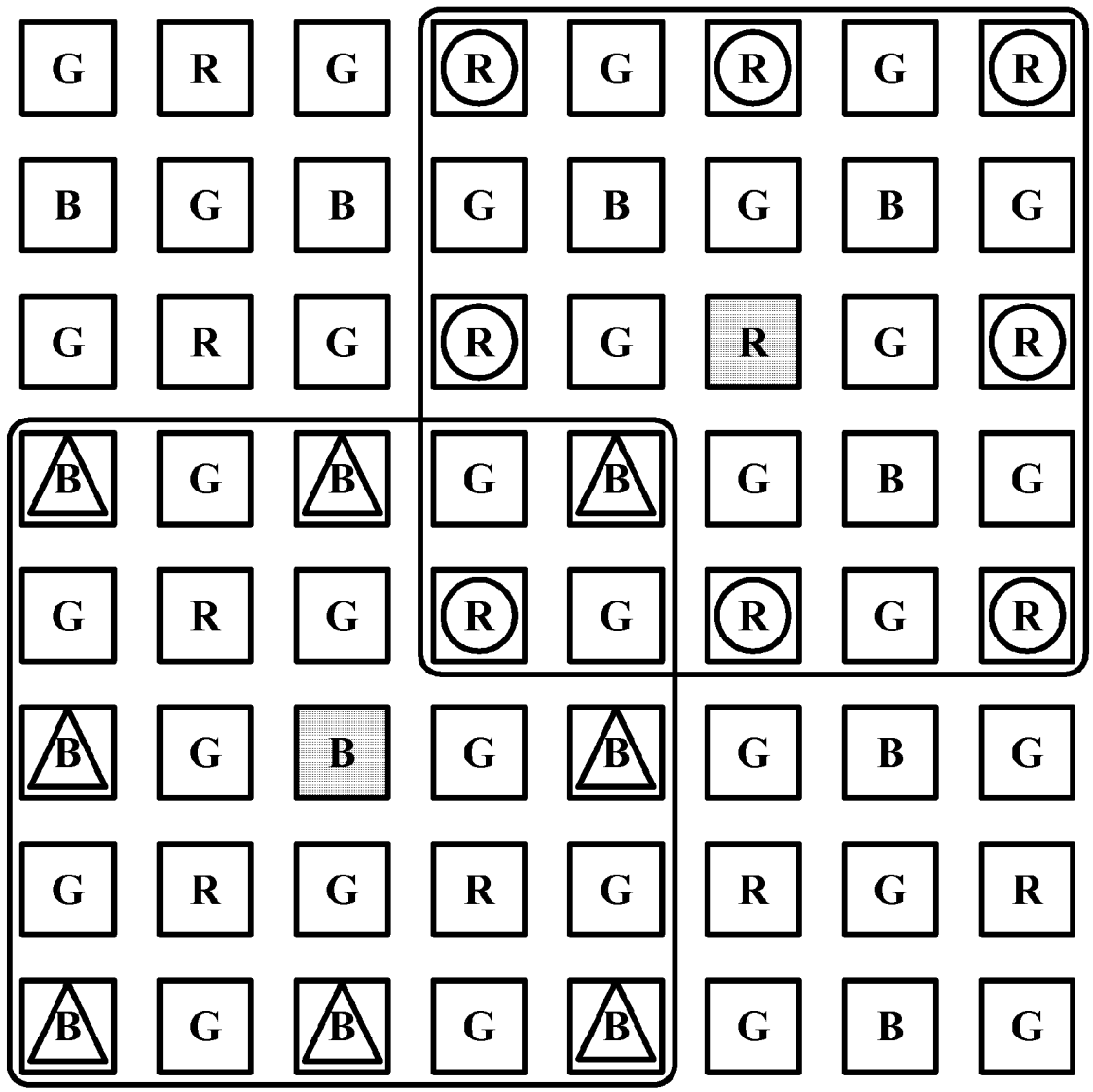
FIG. 1 is an explanatory diagram illustrating readout positions of eight-pixel mixed readout and down sampling readout in the signal readout method of solid-state imaging device according to the present invention.

The following is a description of preferred embodiments for carrying out the present invention, with reference to the accompanying drawings.

The greatest characteristic of the present invention is that the present invention can simultaneously readouts the signals obtained by capturing the same subject under different capturing conditions from one solid-state imaging device by changing the number of pixels to be mixed for every readout signal in one solid-state imaging device, in other words, by performing pixel mixture of the different number of pixels for every readout signal in one solid-state imaging device.

In a word, as the greatest feature of the present invention is that the pixel mixture technique is applied to one solid-state imaging device with a color filter array (CFA) and multiple pixels, and the signals having different properties are readout. This greatest feature of the present invention realizes that the signals having different properties are readout by performing the pixel mixture of the different number of pixels for each readout signal in one solid-state imaging device.

In the present invention, it is possible to simultaneously generate (obtain) multiple images obtained by capturing the same subject (the same scene) under different capturing conditions based on the signals having different properties obtained by performing the pixel mixture of the different number of pixels. Further, for example, in the present invention, it is possible to generate a wide dynamic range image by using the generated multiple images having the different capturing conditions, and is applied to the super-resolution processing by utilizing the difference of the property of the spatial direction and generate a super-resolution image by the super-resolution processing. According to the present invention, for example, it is possible to generate an image having high added value such as a wide dynamic range image and a super-resolution image (hereinafter, called simply as a high-added-value image).

The signal readout method of solid-state imaging device according to the present invention is applied to a solid-state imaging device with a color filter array (CFA) and multiple pixels. In the signal readout method of solid-state imaging device according to the present invention, a pixel mixture of a different number of pixels is performed for every readout signal in the solid-state imaging device and a signal after the pixel mixture is readout.

In the signal readout method of solid-state imaging device according to the present invention, for example, the signal after the pixel mixture means a first signal after the pixel mixture and a second signal after the pixel mixture, the first signal after the pixel mixture is obtained by performing the pixel mixture of predetermined L pixels (L≦n×m) within (n×m) pixels (n and m are natural numbers) consisting of n pixels in a vertical direction and m pixels in a horizontal direction of the solid-state imaging device, the second signal after the pixel mixture is obtained by down sampling pixel signals of the (n×m) pixels without performing the pixel mixture of the (n×m) pixels.

Next, in the image signal processing method according to the present invention, a wide dynamic range image is generated based on the first signal after the pixel mixture and the second signal after the pixel mixture that are readout by the signal readout method of solid-state imaging device according to the present invention described above.

Further, in the image signal processing method according to the present invention, a registration processing of images is performed based on the first signal after the pixel mixture that is readout by the signal readout method of solid-state imaging device according to the present invention, and a super-resolution image is generated by performing a super-resolution processing based on displacement information obtained by the registration processing and the second signal after the pixel mixture that is readout by the signal readout method of solid-state imaging device according to the present invention.

The present invention is described in more detail below through the following specific embodiment.

FIG. 1 is an explanatory diagram illustrating readout positions of an eight-pixel mixed readout and a one-pixel mixed readout in the signal readout method of solid-state imaging device according to the present invention. Since the one-pixel mixed readout can be regarded as a down sampling readout, hereinafter, the one-pixel mixed readout is simply called as the down sampling readout.

In a preferred embodiment of the signal readout method of solid-state imaging device according to the present invention shown in FIG. 1, the solid-state imaging device has a CFA with Bayer arrangement, an eight-pixel mixed readout signal is obtained by performing the pixel mixture of predetermined eight pixels (in this embodiment, the eight pixels having the same channel of color space) within twenty-five pixels consisting of five pixels in a vertical direction and five pixels in a horizontal direction of the solid-state imaging device, and a down sampling readout signal is obtained by down sampling pixel signals of the twenty-five pixels without performing the pixel mixture of the twenty-five pixels.

In other words, in the embodiment of FIG. 1, the signal readout method of solid-state imaging device that combines the eight-pixel mixed readout and the down sampling readout, is carried out. In addition, in FIG. 1, in order to avoid the complication of the drawing, only an R channel and a B channel of RGB color space are illustrated.

Here, an image generated by the eight-pixel mixed readout of FIG. 1 is called as an eight-pixel mixed image, and an image generated by the down sampling readout of FIG. 1 is called as a down sampling readout image.

Therefore, in the eight-pixel mixed image, since the pixel values of the eight pixels are mixed, the eight-pixel mixed image has sensitivity which is eight times as high as that of the down sampling readout image.

In the image signal processing method according to the present invention, one wide dynamic range image is generated based on the multiple images captured (obtained) under different sensitivity conditions, namely, based on the eight-pixel mixed image and the down sampling readout image that are obtained by the signal readout method of solid-state imaging device according to the present invention.

As a method for generating the wide dynamic range image based on the multiple images captured under different sensitivity conditions, for example, a method disclosed in Non-Patent Document 1 can be utilized. Also an image converting method for effectively displaying the wide dynamic range image is disclosed in Non-Patent Document 1.

Figure 2:
FIG. 2 is a diagram illustrating the down sampling readout image and the eight-pixel mixed image described schematically in FIG. 1, and a wide dynamic range image generated based on the down sampling readout image and the eight-pixel mixed image by using the image signal processing method according to the present invention.
Figure 2:
Figure 2:

FIG. 2 is a diagram illustrating the down sampling readout image and the eight-pixel mixed image described schematically in FIG. 1, and a wide dynamic range image generated based on the down sampling readout image and the eight-pixel mixed image by using the image signal processing method according to the present invention. In FIG. 2, the method disclosed in Non-Patent Document 1 is used for the generation processing of the wide dynamic range image and the image conversion for effectively displaying the generated wide dynamic range image.

Figure 3:
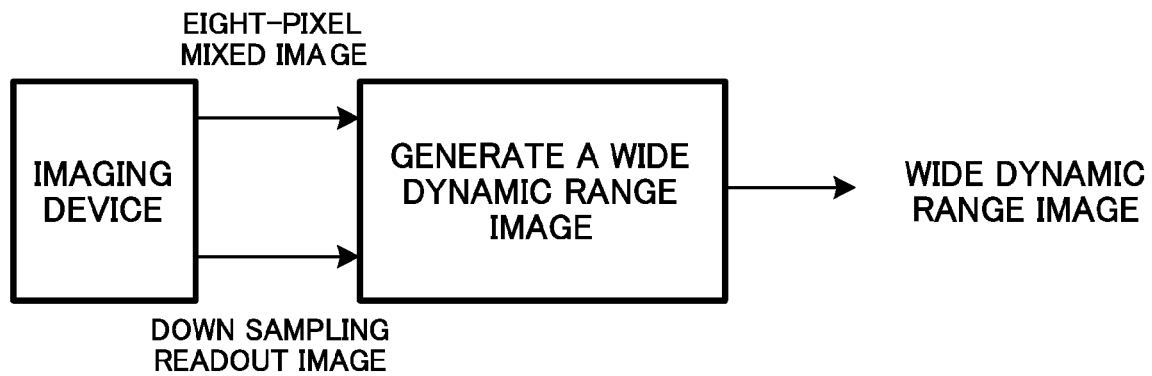
FIG. 3 is a block diagram illustrating a processing flow for generating the wide dynamic range image shown in FIG. 2 in the image signal processing method according to the present invention.

FIG. 3 is a block diagram illustrating a processing flow for generating the wide dynamic range image shown in FIG. 2 in the image signal processing method according to the present invention. As shown in FIG. 3, first, the eight-pixel mixed image and the down sampling readout image are generated by applying the signal readout method of solid-state imaging device according to the present invention to the solid-state imaging device with a CFA and multiple pixels, and then the wide dynamic range image is generated by for example using the method disclosed in Non-Patent Document 1 based on the generated eight-pixel mixed image and the down sampling readout image.

Applying the multiple images obtained by the signal readout method of solid-state imaging device according to the present invention to the super-resolution processing is described below through a specific embodiment.

The super-resolution processing is known as a technique for generating one high-resolution image based on multiple low-resolution images. The super-resolution processing is performed based on displacement information between low-resolution images. Further, the displacement information between low-resolution images is estimated by registration processing. In the case where the displacement information is accurately obtained, a high-resolution image with higher-definition is generated so as to the influence of aliasing included in the low-resolution images is larger.

However, in the case where the low-resolution images include the large influence of aliasing, an error is included in the displacement information estimated by the registration processing. There is a problem that the high-resolution image with high definition is not generated due to the error of the displacement information.

Since a high-resolution image with high-definition can be generated by performing the super-resolution processing based on the multiple images obtained by the signal readout method of solid-state imaging device according to the present invention, therefore the above problem can be solved.

As a specific embodiment, as shown in FIG. 1, the eight-pixel mixed readout and the down sampling readout are combined to be used. Since the pixel mixture is a processing corresponding to spatial averaging processing, the eight-pixel mixed image has less influence of aliasing. On the other hand, the down sampling readout image includes a lot of influences of aliasing. In the present invention, the features of the eight-pixel mixed image and the down sampling readout image are utilized so that the high-resolution image with high definition is generated by the super-resolution processing.

That is to say, in the image signal processing method according to the present invention, first, the displacement information is estimated by using the eight-pixel mixed image obtained by the signal readout method of solid-state imaging device according to the present invention, and then the high-resolution image with high definition (hereinafter, simply the super-resolution image) is generated by performing the super-resolution processing that utilizes the down sampling readout image obtained by the signal readout method of solid-state imaging device according to the present invention and based on the estimated displacement information.

The generation processing of the super-resolution image by using the image signal processing method according to the present invention, is specifically described with reference to the block diagram of FIG. 4.

Figure 4:
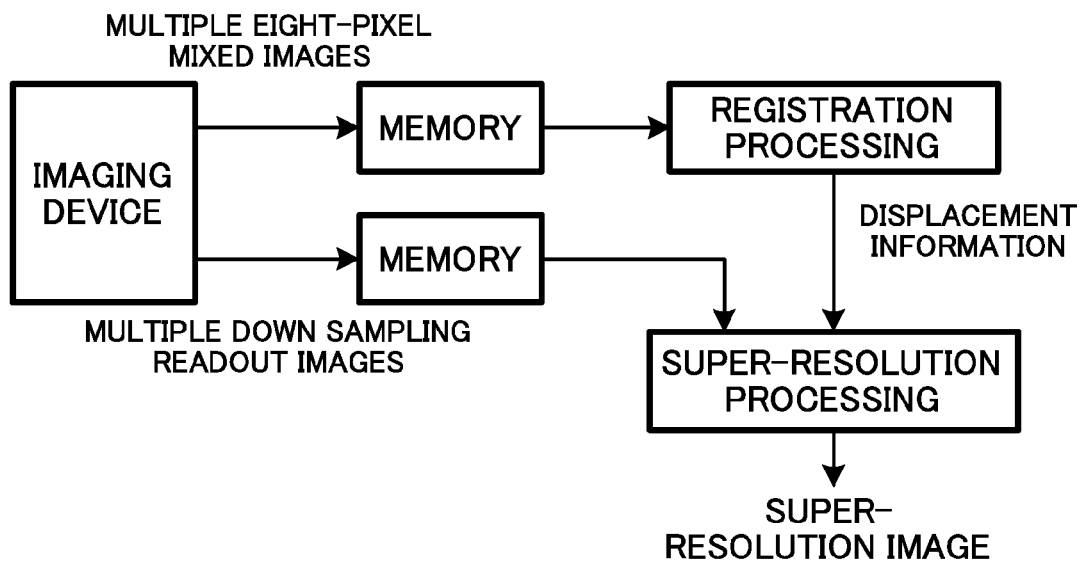
FIG. 4 is a block diagram illustrating a processing flow for generating a super-resolution image by using the image signal processing method according to the present invention.

As shown in FIG. 4, first, the multiple eight-pixel mixed images and the multiple down sampling readout images are readout continuously by applying the signal readout method of solid-state imaging device according to the present invention to the solid-state imaging device with a CFA and multiple pixels, and then the multiple eight-pixel mixed images and the multiple down sampling readout images that are readout, are saved in a memory.

Next, the displacement amount (the displacement information) between the multiple eight-pixel mixed images saved in the memory, is estimated by the registration processing.

Then, the super-resolution image is obtained by performing the super-resolution processing based on the displacement information obtained by the registration processing and the multiple down sampling readout images saved in the memory.

As to details of the registration processing and the super-resolution processing, see Non-Patent Document 2, for example.

Figure 5:
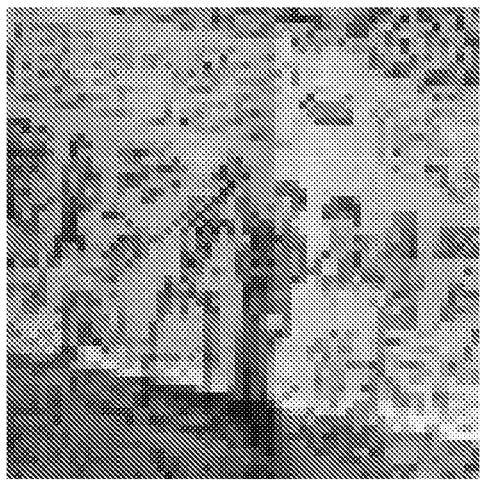
FIG. 5 is a diagram illustrating the down sampling readout image and the eight-pixel mixed image described schematically in FIG. 1, and the super-resolution processed image generated based on the down sampling readout image and the eight-pixel mixed image along the procedure of the block diagram of FIG. 4.
Figure 5:
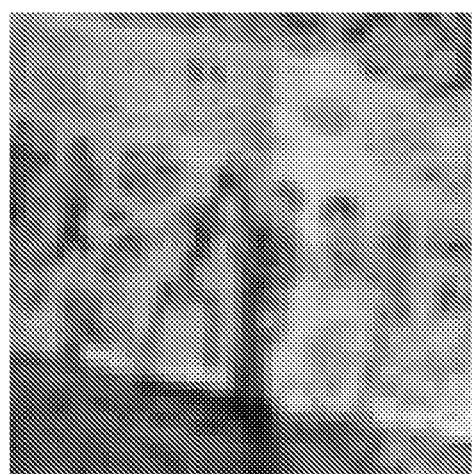
Figure 5:

FIG. 5 is a diagram illustrating one down sampling readout image and one eight-pixel mixed image described schematically in FIG. 1, and the super-resolution processed image generated based on the down sampling readout image and the eight-pixel mixed image along the procedure of the block diagram of FIG. 4. In FIG. 5, the eight-pixel mixed image has sensitivity which is eight times as high as that of the down sampling readout image, but its gain is adjusted so that its sensitivity becomes equal with the sensitivity of the down sampling readout image.

It can be confirmed from FIG. 5 that the super-resolution image generated by the image signal processing method according to the present invention has higher definition than those of the down sampling readout image and the eight-pixel mixed image.

INDUSTRIAL APPLICABILITY

As described above, according to the signal readout method of solid-state imaging device of the present invention, since the signals having different properties can simultaneously readout from one solid-state imaging device, so the present invention plays an excellent effect such that the multiple images obtained by capturing the same subject under different capturing conditions can be generated.

Further, according to the image signal processing method of the present invention, the present invention plays an excellent effect such that the image having high added value such as a wide dynamic range image and a super-resolution image obtained by the super-resolution processing can be generated based on the multiple images having the different capturing conditions that are obtained by the signal readout method of solid-state imaging device of the present invention.

THE LIST OF REFERENCES

Patent Document 1:
Japanese Patent Publication No. 2005-109968
Non-Patent Document 1:
"Recovering High Dynamic Range Radiance Maps From Photographs" written by P. E. Debevec and J. Malik, Proc. ACM SIGGRAPH' 97, p. 369-378
Non-Patent Document 2:
"Image Mosaicing and Super-Resolution" written by David Capel, Springer, 2004

What is claimed is:

1. An image signal processing method for generating a super-resolution image by using signals after a pixel mixture that are readout by a signal readout method of solid-state imaging device,
    said signal readout method of solid-state imaging device is a method that is applied to a solid-state imaging device with a color filter array (CFA) and multiple pixels,
    wherein said pixel mixture of a different number of pixels is performed for every readout signal in said solid-state imaging device, and said signals after said pixel mixture are readout,
    wherein said signals after said pixel mixture mean a first signal after said pixel mixture and a second signal after said pixel mixture, said first signal after said pixel mixture is obtained by performing said pixel mixture of predetermined L pixels (L<n×m) within (n×m) pixels (n and m are natural numbers) consisting of n pixels in a vertical direction and m pixels in a horizontal direction of said solid-state imaging device, said second signal after said pixel mixture is obtained by down sampling pixel signals of said (n×m) pixels without performing said pixel mixture of said (n×m) pixels, said image signal processing method characterized in that a registration processing of images is performed based on said first signal after said pixel mixture that is readout by said signal readout method of solid-state imaging device, and said super-resolution image is generated by performing a super-resolution processing based on displacement information obtained by said registration processing and said second signal after said pixel mixture that is readout by said signal readout method of solid-state imaging device.

* * * * *